Figure 1:
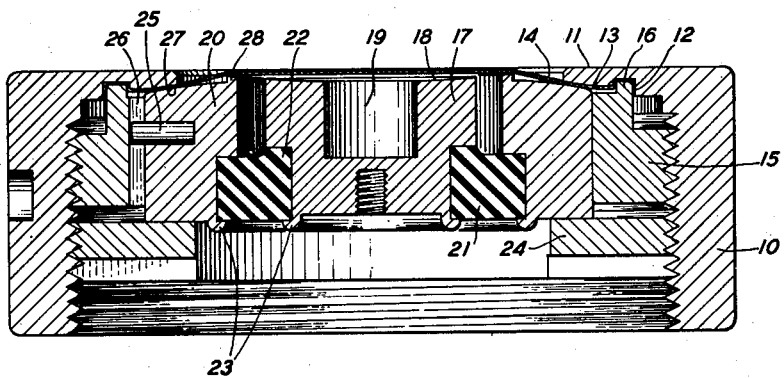

March 14, 1950

W. A. MUNSON ET AL 2,500,643

CONDENSER TRANSDUCER INDEPENDENT OF
AMBIENT ATMOSPHERIC CONDITIONS

Filed Dec. 7, 1946

INVENTORS: W. A. MUNSON
E. C. WENTE

BY

ATTORNEY

Patented Mar. 14, 1950

2,500,643

UNITED STATES PATENT OFFICE 2,500,643

CONDENSER TRANSDUCER INDEPENDENT OF AMBIENT ATMOSPHERIC CONDITIONS

Wilden A. Munson, Chatham, and Edward C. Wente, Summit, N. J., assignors to Bell Telephone Laboratories, Incorporated, New York, N. Y., a corporation of New York Application December 7, 1946, Serial No. 714,822

10 Claims. (Cl. 179—111)

This invention relates to electroacoustic transducers and more particularly to such transducers of the electrostatic type.

General objects of this invention are to improve the performance and to facilitate the construction of electroacoustic transducers of the electrostatic type.

More specific objects of this invention are to obtain a uniform response over a wide frequency range for such transducers, minimize the effects of temperature and atmospheric pressure variations upon the performance of condenser microphones including an impedance gap or chamber for controlling the diaphragm motion, facilitate the realization of a preassigned diaphragm to electrode spacing in such microphones, prevent deleterious stress concentrations in highly tensioned microphone diaphragms and simplify the assembly of condenser microphones including a diaphragm vibration control gap or chamber.

Electrostatic type transducers, such as condenser microphones, comprise, in general, a diaphragm and an electrode in juxtaposition to one face thereof, the diaphragm and electrode defining a condenser the capacitance of which varies in accordance with vibrations of the diaphragm. The capacitance variations, in the case of a microphone, are translated into corresponding voltage variations in an associated circuit.

In order that the response of such a microphone, that is the voltage change per unit of sound pressure effective upon the diaphragm, may be uniform over the operating frequency range, say from zero to of the order of 10,000 cycles per second, the amplitude of diaphragm motion per unit of sound pressure should be the same over this range. The factors determining the amplitude of diaphragm motion are the vibrational characteristics of the diaphragm itself and the impedance characteristics of the air gap or chamber between the diaphragm and the electrode.

When, as is usually the case, the diaphragm is tensioned the variation in diaphragm displacement per unit of pressure, neglecting the effect of the gap or chamber, is small over a range of frequencies well below the resonant frequency of the system. However, at higher frequencies the displacement per unit of pressure increases more and more as the resonant frequency is approached. This effect may be counteracted by designing the air gap or chamber noted to control the diaphragm motion.

The character of the control possible by the gap or chamber will be understood from the following considerations of the case where the gap is open at its margin and communicates with a large volume of air. At low frequencies of diaphragm vibration, the air moves into or out of the gap with very little compression or expansion. Some power is dissipated because of the viscosity of the air. At high frequencies, little of the air will have time to flow into and out of the air gap. Hence, little power is dissipated. However, the air in the gap will be condensed and rarefied alternately so that a stiffness reactance load is placed upon the diaphragm. At intermediate frequencies, the load placed upon the diaphragm by the gap comprises both resistance and stiffness reactance, in parallel.

The stiffness reactance of such an air gap varies directly with the atmospheric pressure. Hence, control of the diaphragm motion by utilization of the stiffness reactance is not satisfactory, particularly in the case of devices which are intended for use at a wide range of altitudes, for example in planes. Control by utilization of the resistance of the gap, although avoiding substantial variations with atmospheric pressure, inasmuch as air viscosity is substantially independent of pressure, may not be entirely satisfactory because of variations in viscosity, and hence changes in damping, with changes in temperature.

In accordance with one feature of this invention, in a condenser microphone including a diaphragm motion controlling gap or chamber, the latter is so constructed and arranged that the control is substantially unaffected by changes in temperature or atmospheric pressure.

More specifically, in accordance with one feature of this invention, the control gap or chamber is constructed so that the ratio of the resistance to the reactance thereof is large whereby the impedance presented thereby is predominantly resistive over the operating frequency range, and means are provided for compensating for the variation in air viscosity with temperature.

In accordance with another feature of this invention, the diaphragm is tuned, by stretching, so that its resonance frequency is well above the operating frequency range. The tuning is effected by forcing a ring member against the diaphragm, the ring member having its face opposite the diaphragm contoured to prevent deleterious stress concentrations in the diaphragm when the member is forced thereagainst.

In accordance with a further feature of this invention, after the diaphragm is stretched to tune it, a portion thereof opposite the ring member is burnished whereby the diaphragm assumes a more nearly planar form and the diaphragm to back electrode spacing is adjusted to a prescribed value.

In accordance with still another feature of this invention, the tuning ring member and the electrode are fabricated as a unitary assembly and the face of the electrode toward the diaphragm and a portion of the ring member are correlated so that when the tuning ring is forced against the diaphragm, the gap between the diaphragm and electrode is fixed and maintained of a prescribed depth, whereby the desired impedance for the control gap is assured.

Figure 2:
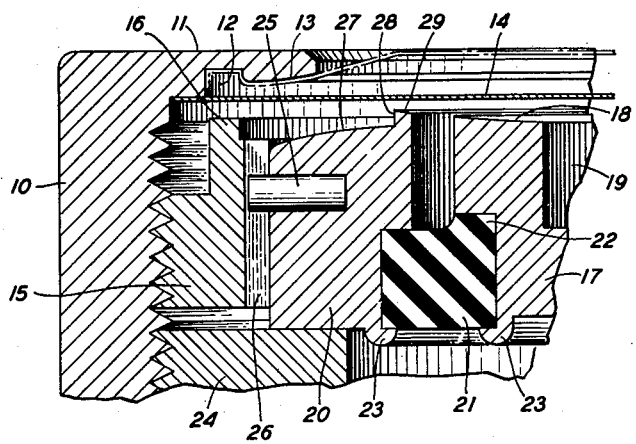

The invention and the above-noted and other features thereof will be understood more clearly and fully from the following detailed description with reference to the accompanying drawing, in which:

Fig. 1 is a cross-sectional view of a condenser microphone illustrative of one embodiment of this invention; and Fig. 2 is a detail view in section and to an enlarged scale of a portion of the microphone illustrated in Fig. 1, showing the relation of parts before the tuning and clamping rings are forced into position.

Referring now to the drawing, the condenser microphone therein illustrated comprises a cylindrical, metal frame or casing 10 having an annular flange or face portion 11 at one end thereof. The flange 11 is provided upon its inner face with an annular channel or groove 12 and an annular convex portion 13. Disposed across the opening in the face portion 11 and clamped against the inner surface of this portion as hereinafter described is a thin, circular metallic diaphargm 14 of high tensile strength, for example of 1.7 mil thick sheet aluminum alloy known as Duralumin. The diaphragm is clamped adjacent its periphery by a clamping ring 15 which is threaded into the casing 10 and includes an annular projection 16 insertable into the groove 12. As shown clearly in Fig. 2, the diaphragm is of such diameter as to fit closely within the casing 10. When the clamping ring 15 is screwed into place, the projection 16 forces the peripheral portion of the diaphragm into the channel or groove 12, and the diaphragm is tensioned uniformly radially and securely held at its periphery.

A metallic electrode 17 is mounted in proximity to and coaxial with the diaphragm and is provided with an annular, shallow concave face 18 and a central recess 19, the function of which will appear hereinafter. The electrode 17 is mounted coaxially within a tuning ring 20 by an insulating annulus 21, the annulus 21 having an annular projection 22 and being locked securely to the electrode 17 and ring 20 by pressing of the electrode and ring material thereagainst as shown at 23.

The tuning ring 20 is fitted slidably within the clamping ring 15, is arranged to be moved by a drive ring 24 threaded to the casing 10 and is held against rotation relative to the clamping ring by a pin 25 slidable within a longitudinal slot 26 in the clamping ring. The inner end of the tuning ring 20 has an annular convex surface 27 and an annular shoulder 28 the end face 29 of which is concavely curved and has the same center of curvature as the electrode surface 18.

Upon rotation of the drive ring 24, the shoulder 28 is forced against the diaphragm 14 so that the central portion of the diaphragm is stretched and the resonant frequency of the diaphragm thus is raised. The dimensions of the parts involved are correlated so that when the tuning ring 20 is so forced inwardly to the maximum extent, the resonance frequency of the diaphragm is well above the highest frequency in the range to be translated. For example, if the operating frequency range extends to 10,000 cycles per second, the diaphragm may be tuned to of the order of 15,000 or 16,000 cycles per second. When the tuning ring is thus forced inwardly to the extreme position, opposite faces of the diaphragm are engaged by the convex surfaces 13 and 27 of the flange 11 and ring 20 respectively, whereby deleterious stress concentrations in the diaphragm are avoided, so that a thin diaphragm may be employed. The final position and form of the diaphragm are shown in dotted outline in Fig. 2.

Inasmuch as the concave surfaces 18 and 29 of the electrode 17 and shoulder 28 respectively have the same center of curvature, it will be appreciated that a gap of prescribed depth will be provided between the diaphragm and the back electrode when the tuning ring is driven to its final position.

When the diaphragm has been stretched as above described, it may be slightly bowed so that the gap between it and the back electrode may be somewhat greater than that desired. The gap is reduced by burnishing the front face of the diaphragm lightly opposite the shoulder 28. The burnishing may be effected, for example, by a leather pad having angularly or circularly spaced feet which are placed against the diaphragm, opposite the shoulder. The pad is rotated, e. g. alternately clockwise and counter-clockwise, until the capacitance between the diaphragm and back electrode, which is a measure of the gap length, rises to a preassigned value. The effect of the burnishing is to reduce the bow in the diaphragm, whereby the gap length decreases and the diaphragm to back electrode capacitance increases.

The aforementioned gap provides impedance for controlling the diaphragm motion to assure a uniform response over the operating frequency range. Specifically, the gap introduces both resistance, due to radially inward and outward flow of air therein, and stiffness reactance due to the compression and rarefaction of the air, both as the diaphragm vibrates. Both the resistance and reactance are dependent upon the radial width of the air gap or, more specifically, upon the area of the electrode surface in juxtaposition to the diaphragm, the resistance varying as the square and the reactance as the first power of this area. In the construction shown and described, it will be appreciated that because of the recess 19 in the electrode 17, the mean distance through which air in the gap between the diaphragm 14 and electrode surface 18 is forced to move as a result of motion of the diaphragm is relatively short. Consequently, a high ratio of resistance to reactance is obtained and the impedance of the air gap is predominantly resistive over the operating frequency range of the microphone.

In this connection, two points may be noted. Both the gap resistance and reactance are dependent upon the depth of the gap, the resistance varying inversely with the cube of the depth and the reactance with the first power of the depth. Inasmuch as, as pointed out heretofore, the diaphragm is very thin and of lightweight material, the mass of the diaphragm is small. Hence, relatively small damping is required and both the requisite damping and desired ratio of resistance to reactance may be obtained without utilization of an impracticably small depth air gap. In a specific construction including a diaphragm of 1.7 mil Duralumin and having a central active portion (the portion within the shoulder 28) 0.7 inch in diameter, a gap of substantially 0.001 inch in depth and an electrode face 18 substantially 0.4 inch in radial width have been found satisfactory, the diaphragm being tuned to 15.5 kilocycles and the operating frequency range extending to about 10,000 cycles.

As has been pointed out heretofore, the stiffness reactance of the air gap is dependent upon pressure but is substantially independent of temperature whereas the resistance is substantially independent of pressure but is dependent upon temperature. It is apparent, then, that in a construction such as that shown and described, wherein the gap impedance is predominantly resistive, control of the diaphragm motion would be susceptible to variation with temperature changes.

The viscosity of air and, hence, the resistance of the gap diminishes as the temperature decreases. As has been noted hereinabove, this resistance increases as the depth of the air gap decreases. In accordance with one feature of this invention, the electrode is so mounted that the air gap depth is adjusted automatically to compensate for changes in resistance with temperature, i. e., the air gap depth is decreased as the temperature falls and is increased as the temperature rises.

Thermally, the temperature compensation involves three elements, to wit, the electrode 17, annulus 21 and the tuning ring 20. If the annulus 21 is of a material having a coefficient of expansion and contraction different from that for the electrode 17 and ring 20, it is apparent that because of the projecting portion 22 on the annulus the relation of the surfaces 18 and 29, which determines the air gap depth, will vary with temperature as a result of differential expansion of the components. The magnitude of the change will be dependent, of course, upon the relative coefficients of the components and the axial length thereof. In a specific construction found satisfactory to effect compensation and, hence, resistance stability, over a range of temperatures from about −30° C. to +60° C., a Duralumin electrode 17 and tuning ring 21 and a ceramic annulus 20 of steatite were employed. In such a construction, the dimensions were as follows:

Overall height of ring 20, from ring 24 to tip of shoulder 28, 0.360″.
Height of ring 20, from annulus 21 to tip of shoulder 28, 0.195″.
Height of annulus 21 from ring 24 to tip of projection 22, 0.200″.
Height of projection 22, 0.025″.
Height of electrode 17, from projection 22 to surface 18 (max.), 0.160″.

Inasmuch as the coefficient of expansion and contraction of steatite is less than that of Duralumin, when the temperature decreases, the surface 29 drops relative to the surface 18, so that the air gap depth decreases, whereby the decrease in air gap resistance due to diminishing air viscosity is compensated for by increase in resistance due to decrease in air gap depth.

Although a specific embodiment of the invention has been shown and described, it will be understood that it is but illustrative and that various modifications may be made therein without departing from the scope and spirit of this invention as defined in the appended claims.

What is claimed is:

1. An electroacoustic transducer comprising a diaphragm, means for tensioning said diaphragm to tune it including a first member bearing against one surface of said diaphragm, means defining an impedance gap with said diaphragm for controlling the motion thereof including a second member having a face in proximity to said one surface of said diaphragm, and a third member mounting said second member from said first member, said third member having a surface toward said diaphragm abutting said first member and having a projection on said surface thereof against which said second member is seated, and said third member having a thermal coefficient of expansion less than that of said first and second members, whereby the depth of said gap decreases with decrease in temperature.

2. An electroacoustic transducer comprising a diaphragm, means clamping said diaphragm at its periphery, means for tensioning said diaphragm to tune it comprising a tuning ring bearing against one surface of said diaphragm intermediate the center and the periphery thereof, an annular member in juxtaposition to said one surface of said diaphragm, opposite the central portion thereof and defining therewith an impedance gap for controlling the motion of said diaphragm, and a second annular member between said tuning ring and said first annular member, said second annular member having an axial projection thereon against which said first annular member is seated and having a thermal coefficient of expansion less than that of said first annular member and tuning ring, whereby the depth of said gap decreases with decrease in temperature.

3. A condenser microphone comprising a metallic diaphragm, means securing said diaphragm at its periphery, an electrode opposite a central portion of one surface of said diaphragm and defining therewith a restricted gap for controlling the diaphragm motion, a tuning ring encircling said electrode and bearing against said one surface of said diaphragm, and means, mounting said electrode from said tuning ring, for adjusting the depth of said gap to compensate for variations in the resistance thereof with temperature, said means comprising an annular member having a face toward said one surface of said diaphragm abutting said tuning ring and having a projection upon said face thereof against which said electrode is seated, and said annular member having a thermal coefficient of expansion less than that for said tuning ring and electrode.

4. A condenser microphone in accordance with claim 3 wherein said tuning ring and electrode are of an aluminum alloy and said annular member is of steatite.

5. An electroacoustic transducer comprising a diaphragm, means defining with said diaphragm an impedance for controlling the diaphragm motion, said impedance being predominantly resistive over the operating frequency range of the transducer, and said means comprising a first member having a surface in immediate proximity to one face of said diaphragm and having also a recess therein the open end of which is at said surface, and means for increasing the spacing between said surface and said diaphragm face in response to increases in ambient temperature comprising a second member mounting said first member and having a thermal coefficient of expansion less than that for said first member.

6. An electroacoustic transducer comprising a diaphragm, means mounting said diaphragm adjacent its periphery, means for tensioning said diaphragm to tune it comprising a tuning member having an annular portion bearing against one face of said diaphragm, and means defining with said diaphragm an impedance gap for controlling the diaphragm motion, said means comprising a member having a surface in immediate proximity to said one face of said diaphragm and encompassed by said annular portion of said tuning member, the face of said annular portion toward said diaphragm and the surface of said second member opposite said diaphragm being concave and having the same center of curvature.

7. A condenser microphone comprising a diaphragm, means clamping said diaphragm adjacent its periphery, means for tensioning said diaphragm to tune it including a tuning member having an annular portion bearing against one face of said diaphragm, an electrode encompassed by said tuning member and having one end in immediate proximity to said one face of said diaphragm, and means fixedly connecting said tuning member and electrode, said end of said electrode and said annular portion being concave and having the same center of curvature.

8. An electroacoustic transducer comprising a diaphragm, a support member, means clamping the periphery of said diaphragm to said support member, said support member having a convex portion overlying and engaging one face of said diaphragm adjacent the periphery thereof, and means for tensioning said diaphragm including a tensioning member having a convex surface portion opposite said convex portion and engaging the other face of said diaphragm and having a second portion further removed from the periphery of said diaphragm than said convex surface portion and bearing against said other face of said diaphragm.

9. An electroacoustic transducer comprising a thin, circular metallic diaphragm, a frame member having an annular convex surface coaxial with and engaging one face of said diaphragm adjacent but inside the peripheral part thereof, means clamping the periphery of said diaphragm to said frame member, and an annular tensioning member coaxial with said annular surface, having an outer annular convex portion opposite said convex surface and engaging the other face of said diaphragm and having also an inner annular projection bearing against said other face of said diaphragm.

10. In the manufacture of an electroacoustic transducer of the electrostatic type, the method of adjusting the gap between the diaphragm and the electrode of the transducer which comprises tensioning said diaphragm by forcing a tuning member against the face of said diaphragm in juxtaposition to said electrode until said diaphragm has a preassigned natural frequency and burnishing regions of the other face of said diaphragm opposite the tuning ring until the capacitance between said diaphragm and said electrode is of a prescribed value.

WILDEN A. MUNSON.
EDWARD C. WENTE.

REFERENCES CITED

The following references are of record in the file of this patent:

UNITED STATES PATENTS

| Number | Name | Date |
| --- | --- | --- |
| 1,333,744 | Wente | Mar. 16, 1920 |
| 1,456,538 | Crandall | May 29, 1923 |
| 1,722,347 | Wente | July 30, 1929 |
| 2,086,107 | Wilson | July 6, 1937 |
| 2,159,628 | Danielson | May 23, 1939 |
| 2,297,211 | Gerlach | Sept. 29, 1942 |

FOREIGN PATENTS

| Number | Country | Date |
| --- | --- | --- |
| 389,888 | Great Britain | Mar. 30, 1933 |